(12) United States Patent
Lee et al.

(10) Patent No.: US 7,603,039 B2
(45) Date of Patent: Oct. 13, 2009

(54) BIDIRECTIONAL OPTICAL SIGNAL TRANSMITTING AND RECEIVING SYSTEM WITH A SINGLE MAIN AMPLIFIER

(75) Inventors: Tae Woo Lee, Daejeon (KR); Sae Kyong Kang, Jeollabuk (KR); Hyo Hoon Park, Daejeon (KR)

(73) Assignee: Information and Communications University Research and Industrial Cooperation Group, Daejeon (KR)

( * ) Notice: Subject to any disclaimer, the term of this patent is extended or adjusted under 35 U.S.C. 154(b) by 496 days.

(21) Appl. No.: 11/052,828

(22) Filed: Feb. 9, 2005

(65) Prior Publication Data

US 2006/0051102 A1    Mar. 9, 2006

(30) Foreign Application Priority Data

Sep. 6, 2004    (KR) .................. 10-2004-0070716

(51) Int. Cl.
     *H04B 10/00*    (2006.01)
(52) U.S. Cl. ............... 398/135; 398/138; 398/139; 398/164; 398/67
(58) Field of Classification Search ............ 398/135, 398/115, 164, 140, 138, 137, 67
     See application file for complete search history.

(56) References Cited

U.S. PATENT DOCUMENTS

| | | | | |
|---|---|---|---|---|
| 5,272,555 | A * | 12/1993 | Suzuki | 398/41 |
| 6,510,309 | B1 * | 1/2003 | Thompson et al. | 455/78 |
| 6,563,848 | B1 * | 5/2003 | Iwazaki | 372/38.02 |
| 6,583,882 | B2 * | 6/2003 | Scruggs et al. | 356/460 |
| 6,583,908 | B1 * | 6/2003 | Nakamura | 398/126 |
| 6,678,893 | B1 * | 1/2004 | Jung | 725/111 |
| 7,212,589 | B2 * | 5/2007 | Baumgartner | 375/325 |
| 7,248,800 | B2 * | 7/2007 | Shimada et al. | 398/135 |

(Continued)

FOREIGN PATENT DOCUMENTS

JP    11-068658    3/1999

(Continued)

OTHER PUBLICATIONS

English language Abstract of JP 11-068658.

(Continued)

*Primary Examiner*—Ken N Vanderpuye
*Assistant Examiner*—Hibret A Woldekidan
(74) *Attorney, Agent, or Firm*—Greenblum & Bernstein, P.L.C.

(57) ABSTRACT

Disclosed herein is an optical interconnecting system for transmitting a large amount of data. The system includes a bidirectional transmitting/receiving circuit that is installed at each of both ends of a data line between chips or boards, selectively receives an electric signal or an optical signal, amplifies and converts the received signal and selectively outputs the signal. The optical interconnecting system integrates a transmitter and a receiver into one bidirectional transmitting/receiving circuit to reduce circuit design and manufacturing costs and decrease power consumption. The system can integrate the bidirectional transmitting/receiving circuit in a highly integrated semiconductor chip and extend it to a multi-dimension multi-channel form to produce a compact package. Moreover, the system can freely select an electric signal or an optical signal as input/output signal forms at input/output stages using the select switches of the bidirectional transmitting/receiving circuit and thus the system can be applied to various applications.

6 Claims, 1 Drawing Sheet

U.S. PATENT DOCUMENTS

| | | | |
|---|---|---|---|
| 7,266,302 B2 * | 9/2007 | Bremner et al. | 398/138 |
| 7,286,767 B2 * | 10/2007 | Franck et al. | 398/135 |
| 2002/0001361 A1 * | 1/2002 | Ueno et al. | 375/376 |
| 2003/0021224 A1 * | 1/2003 | Devitt | 370/220 |
| 2003/0104780 A1 * | 6/2003 | Young | 455/7 |
| 2004/0235426 A1 * | 11/2004 | Pozgay et al. | 455/73 |

FOREIGN PATENT DOCUMENTS

JP      2003-332982      11/2003

OTHER PUBLICATIONS

English language Abstract of JP 2003-332982.

* cited by examiner

BIDIRECTIONAL OPTICAL SIGNAL TRANSMITTING AND RECEIVING SYSTEM WITH A SINGLE MAIN AMPLIFIER

BACKGROUND OF THE INVENTION

1. Field of the Invention

The present invention relates to an optical interconnecting system for transmitting data. More particularly, the invention relates to an optical interconnecting system for transmitting data, which is constructed such that a transmitter and a receiver are integrated into one bidirectional transmitting/receiving circuit to convert an electric signal into an optical signal, transmit the optical signal, and convert the transmitted signal into an electric signal.

2. Background of the Related Art

A transmitter of an optical interconnecting system uses a laser diode (LD) device for converting an electric signal into an optical signal and transmitting the optical signal. The transmitter needs a separate driving circuit for driving the laser diode device. Thus, the laser diode device and the driving circuit construct the transmitter for electric-to-optic signal conversion.

A receiver of the optical interconnecting system uses a photo diode for converting the optical signal transmitted from the transmitter into an electric signal. The receiver requires a pre-amplifier and a limiting amplifier for amplifying a minute electric signal converted by the photo diode. Accordingly, the photo diode, the pre-amplifier and the limiting amplifier construct the receiver for optic-electric signal conversion.

In a conventional optical interconnecting system for transmitting data between chips or boards, a transmitter and a receiver are paired and they transmit and receive data respectively. That is, to transmit and receive data, one data line requires a separate transmitter and a separate receiver. Accordingly, the transmitter and the receiver should be respectively required at both ends of the data line.

FIG. 1 illustrates a conventional optical interconnection transmitting/receiving circuit. As shown in FIG. 1, transmitters 3 and 6 are connected to a laser diode 7 and receivers 4 and 5 are connected to a photo diode 8 to transmit/receive data between first and second semiconductor chips 1 and 2 on a single data line. In the conventional optical interconnection transmitting/receiving circuit, the transmitter 3 and the receiver 4 should be respectively connected to the laser diode 7 and the photo diode 8. This increases power consumption of the system and raises costs required for design, manufacturing and packaging of each circuit. These problems become more serious when a multi-dimensional multi-channel is constructed.

SUMMARY OF THE INVENTION

Therefore, the present invention has been made in view of the above problems occurring in the prior art, and it is an object of the present invention is to provide an optical interconnecting system for transmitting data, which integrates a transmitter and a receiver into one transmitting/receiving circuit to enable bidirectional transmission/reception of data and select an electric signal or an optical signal as input/output signal forms by using transmission/reception select switches to enable extension to a multi-channel and produce a compact package.

To achieve the above object, according to the invention, there is provided an optical interconnecting system for transmitting data which includes a bidirectional transmitting/receiving circuit installed at each of both ends of a data line connecting between the chips or boards, for selectively receiving an electric signal or an optical signal input from an input stage, amplifying the received signal, converting the amplified signal, and selectively outputting the converted signal to an output stage; a laser diode for converting the electric signal input to the bidirectional transmitting/receiving circuit into an optical signal; a photo diode for converting the optical signal input to the bidirectional transmitting/receiving circuit into an electric signal; and an optical waveguide for transmitting the optical signal output from the laser diode to a photo diode of the counterpart bidirectional transmitting/receiving circuit.

The input stage and output stage of the bidirectional transmitting/receiving circuit include an electric signal input terminal connected to one of the chips or one of the boards, an optical signal input terminal connected to the photo diode, an electric signal output terminal connected to the other chip or board, and an optical signal output terminal connected to the laser diode.

Preferably, the bidirectional transmitting/receiving circuit includes a preamplifier for amplifying a minute output signal of the photo diode, a main amplifier for converting an electric signal input from the input stage into a driving signal having a magnitude required for driving the laser diode, supplying the driving signal to the laser diode, further amplifying the signal amplified by the preamplifier and transmitting the amplified signal to the counterpart chip or board, and select switches respectively provided at input and output stages of the main amplifier, for selecting a signal input to the main amplifier.

Preferably, the main amplifier includes a driver for allowing the driving signal supplied to the laser diode to have a driving current suitable for a data transmission operation and a limiting amplifier for receiving the signal amplified by the preamplifier and making it have a voltage gain suitable for a data receiving operation.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE INVENTION

Reference will now be made in detail to the preferred embodiments of the present invention, examples of which are illustrated in the accompanying drawings.

Figure 1:
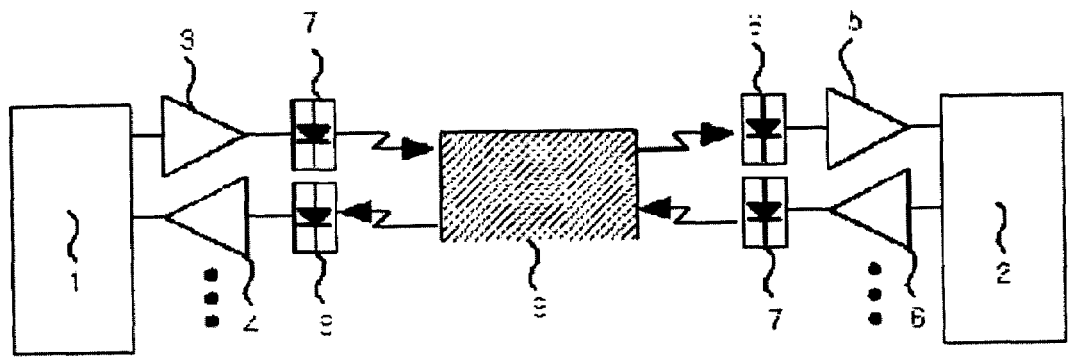
FIG. 1 illustrates the configuration of a conventional optical interconnection transmitting/receiving circuit.
Figure 2:
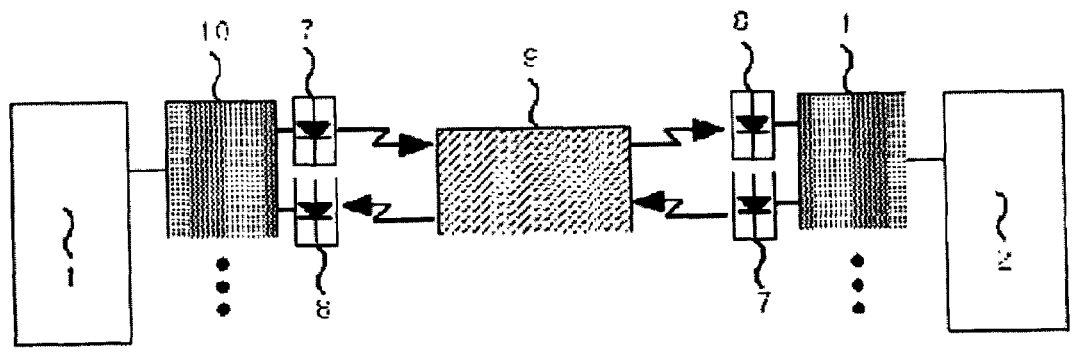
FIG. 2 illustrates the configuration of an optical interconnecting system for transmitting data according to an embodiment of the present invention.
Figure 3:
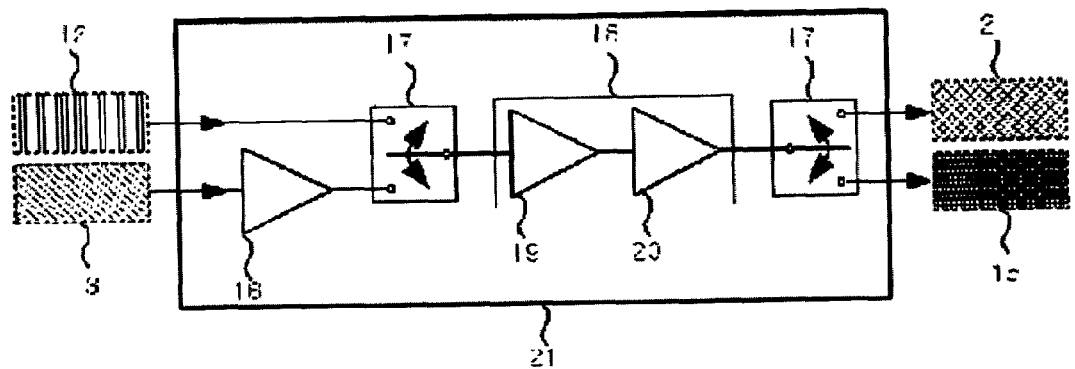
FIG. 3 illustrates the configuration of the bidirectional transmitting/receiving circuit of the system shown in FIG. 2.

FIG. 2 illustrates the configuration of an optical interconnecting system for transmitting data according to an embodiment of the present invention, and FIG. 3 illustrates the configuration of the bidirectional transmitting/receiving circuit of the system shown in FIG. 2.

As shown in FIG. 2, the optical interconnecting system for transmitting data according to the embodiment of the present invention includes bidirectional transmitting/receiving circuits 10 and 11 respectively connected to first and second semiconductor chips 1 and 2, an optical waveguide 9 serving as an optical signal transmission path, laser diodes 7 and photo diodes 8.

Each of the bidirectional transmitting/receiving circuits 10 and 11 is constructed such that the conventional transmitter and receiver are integrated into one circuit.

Referring to FIG. 3, a bidirectional transmitting/receiving circuit 21 includes a preamplifier 16, two select switches 17, and a main amplifier 18. The main amplifier 18 includes a limiting amplifier 19 and a driver 20.

Referring to FIG. 3, the bidirectional transmitting/ receiving circuit 21 further includes an electric signal input terminal 12 connected to the first or second semiconductor chip 1 or 2, an optical signal input terminal 13 connected to the photo diode 8, an electric signal output terminal 14 connected to the first or second semiconductor chip 1 or 2, and an optical signal output terminal 15 connected to the laser diode 7.

The preamplifier 16 amplifies a minute output signal of the photo diode 8. The select switch 17 selects a required signal from signals transmitted from the input terminals 12 and 13 and the output terminals 14 and 15. The main amplifier 18 converts a signal, input through the input terminal 12 or 13 and selected by the select switch 17, into a driving signal with an appropriate magnitude required for driving the laser diode 7 or the photo diode 8, and transmits the driving signal to the corresponding output terminal 14 or 15.

Specifically, when an electric signal is input from the electric signal input terminal 12 to the main amplifier 18 according to the select switch 17 at the input stage, the main amplifier 18 converts the electric signal into a driving signal with a magnitude sufficient to drive the laser diode 7. The select switch 17 at the output stage allows the driving signal converted by the main amplifier 18 to drive the laser diode through the optical signal output terminal 15.

When a minute optical signal is input to the preamplifier 16 through the optical input terminal 13 connected to the photo diode 8 to be amplified and then the amplified signal is input to the main amplifier 18 according to the select switch 17 at the input stage, the main amplifier 18 amplifies the amplified optical signal to a sufficient level and outputs it. Then, the select switch 17 at the output stage transmits the optical signal amplified by the main amplifier 18 to the electric signal output terminal 14.

The main amplifier 18 is commonly used for transmission and reception of signals. Thus, the main amplifier 18 must provide a sufficient driving current for transmission and amplify a minute signal with a sufficient voltage gain for reception to satisfy specifications of the system for transmission and reception. Accordingly, the limiting amplifier 19 of the main amplifier 18 should be designed such that it has a sufficient voltage gain. Furthermore, the driver 20 should be designed such that it provides a sufficient driving current.

The operation of the optical interconnecting system for transmitting data according to the present invention will now be explained in detail.

An electric signal of the first semiconductor chip 1 is input to the main amplifier 18 of the bidirectional transmitting/receiving circuit 10 according to the select switch 17 of the input stage. The main amplifier 18 converts the electric signal into a driving signal for driving the laser diode 7 and amplifies the driving signal. The driving signal amplified by the main amplifier 18 is supplied to the laser diode 17 by the select switch 17 of the output stage and converted into an optical signal by the laser diode 7.

The optical signal converted by the laser diode 7 is transmitted to the second semiconductor chip 2 through the optical waveguide 9 and converted into an electric signal by the photo diode 8. The output signal of the photo diode 8 is amplified by the preamplifier 16 of the bidirectional transmitting/receiving circuit 11, and then input to the main amplifier 18 of the bidirectional transmitting/receiving circuit 11 according to the select switch 17 of the input stage of the transmitting/receiving circuit 11. The main amplifier 18 amplifies the signal amplified by the preamplifier 16 to a sufficient level and transmits the amplified signal to the second semiconductor chip 2 according to the select switch 17 of the output stage of the transmitting/receiving circuit 11.

As described above, the bidirectional transmitting/receiving circuit includes the preamplifier, the main amplifier and the select switches and the main amplifier has both of limiting amplification and driving functions to enable bidirectional transmission/reception of electric/optical signals.

The bidirectional transmitting/receiving circuit of the present invention includes the input terminal and output terminal respectively for an electric signal and an optical signal. Thus, the bidirectional transmitting/receiving circuit can convert an electric signal into an optical signal and convert the optical signal into an electric signal. Furthermore, the circuit can amplify an electric signal-electric signal and an optical signal-optical signal according to combination of the select switches.

As described above, the optical interconnecting system for transmitting data according to the present invention integrates a transmitter and a receiver into one bidirectional transmitting/receiving circuit to reduce circuit design and manufacturing costs and decrease power consumption.

Furthermore, the data transmission system of the present invention can integrate the bidirectional transmitting/receiving circuit in a highly integrated semiconductor chip and extend it to a multi-dimension multi-channel form to produce a compact package. Moreover, the system can freely select an electric signal or an optical signal as input/output signal forms at input/output stages using the select switches of the bidirectional transmitting/receiving circuit and thus the system can be applied to various applications.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A bidirectional transmitting/receiving circuit in which a transmitter and receiver are integrated together by sharing common parts between the transmitter and receiver, and which connects to a laser diode and a photo diode, comprising:

a main amplifier including a main amplifier input and a main amplifier output;

a first switch including an electric signal input for receiving an electrical signal from a semiconductor, an optical signal input for receiving a optical signal from the photo diode, and a first switch output in communication with said main amplifier input for selectively sending the electrical signal and the optical signal to the main amplifier; and a second switch including a second switch input in communication with said main amplifier output for receiving the electrical signal and the optical signal from the main amplifier, an electric signal output for outputting the optical signal to the semiconductor, and an optical signal output for outputting the electrical signal to the laser diode, whereby said first switch receives an electrical signal from the semiconductor, said first switch selectively outputs the electrical signal to said main amplifier, said main amplifier outputs the electrical signal to said second switch, and said second switch selectively outputs the electrical signal to the laser diode, and said first switch receives a optical signal from the photo diode, said first switch selectively outputs the optical signal to said main amplifier, said main amplifier outputs the optical signal to said second switch, and said second switch selectively outputs the optical signal to the laser diode.

2. A bidirectional transmitting/receiving circuit according to claim 1, further comprising a pre-amplifier which amplifies the optical signal received from the photo diode before the main amplifier amplifies the optical signal received from the photo diode.

3. A bidirectional transmitting/receiving circuit according to claim 1, wherein the main amplifier comprises a limiting amplifier and a driver.

4. A bidirectional transmitting/receiving circuit according to claim 1, further comprising a semiconductor chip that is in communication with the electric signal input to send the electrical signal to the electric signal input, the photo diode being in communication with the optical signal input to send the photo signal to the optical signal input, the semiconductor chip being in communication with the electric signal output to receive the amplified photo signal, and the laser diode being in communication with the optical signal output to receive the amplified electrical signal.

5. The bidirectional transmitting/receiving circuit according to claim 4, further comprising a preamplifier in communication with said optical signal input of said first switch for amplifying the photo signal received by the optical signal input from the photo diode.

6. The bidirectional transmitting/receiving circuit according to claim 4, wherein the main amplifier includes a limiting amplifier and a driver.

* * * * *